United States Patent [19]

Miller

[11] Patent Number: 5,218,743
[45] Date of Patent: Jun. 15, 1993

[54] CONNECTING DEVICE

[76] Inventor: John Miller, 411½ W. St. John, Girard, Kans. 66743

[21] Appl. No.: 733,997

[22] Filed: Jul. 22, 1991

[51] Int. Cl.⁵ ............................................. A44B 21/00
[52] U.S. Cl. ................................ 24/68 CD; 292/113; 296/98
[58] Field of Search ................ 24/68 R, 68 CD, 270; 296/98, 100; 292/113, 247, 256.5, 114

[56]         References Cited
        U.S. PATENT DOCUMENTS

| | | |
|---|---|---|
| 4,212,492 | 7/1980 | Johnsen . |
| 4,227,286 | 10/1980 | Holmberg . |
| 4,302,043 | 11/1981 | Dimmer et al. . |
| 4,314,783 | 2/1982 | Parnell et al. . |
| 4,395,796 | 8/1983 | Akaura et al. . |
| 4,428,099 | 1/1984 | Richmond . |
| 4,493,133 | 1/1985 | Nilsson . |
| 4,505,512 | 3/1985 | Schmeichel et al. . |
| 4,510,652 | 4/1985 | van Iperen . |
| 4,542,883 | 9/1985 | Rutzki . |
| 4,584,742 | 4/1986 | Speich . |
| 4,622,721 | 11/1986 | Smetz et al. . |
| 4,706,343 | 11/1987 | Heidigk . |

Primary Examiner—James R. Brittain
Attorney, Agent, or Firm—Litman, McMahon & Brown

[57]            ABSTRACT

A tensile member connecting device includes a base assembly for an installation such as mounting on the sidewall of an open-top truck or trailer bed for connecting straps thereon to secure a tarpaulin or cover in place. A telescopic tube assembly is mounted on the base assembly and includes inner and outer telescopic tubular members interconnected by a spring for extending the inner tubular member. A lever assembly includes a lever bar with a proximate end pivotally mounted on an outer end of the inner tubular member and a distal end. A connection post extends laterally from the lever bar in spaced relation from the pivotal axis of the lever assembly. The lever assembly is swingable about its rotational axis between lock and release positions. An over-center geometry is provided for retaining the lever assembly in its lock position with the extension spring exerting a relatively constant tensile force on the tensile member.

14 Claims, 1 Drawing Sheet

CONNECTING DEVICE

BACKGROUND OF THE INVENTION

I. Field of the Invention

The present invention relates generally to connecting devices, and in particular to a device for connecting, anchoring and tensioning the mounting straps of truck or trailer bed covers.

2. Description of the Related Art

Open-top truck and trailer beds and boxes are commonly designed so that cargo is loaded through their open tops and unloaded through their bottoms or backs. This sometimes creates the need for a cover to keep dust, moisture and other harmful substances from coming into contact with cargo that has been loaded into the truck or trailer bed or box. A cover may also be necessary to prevent cargo from blowing out of the truck or trailer body during high speed transportation. Regardless of whether cargo is loaded into the truck or trailer, a cover can enhance the aerodynamics of the truck or trailer during high speed transportation, thereby improving gas mileage.

Several coverings for open top cargo containers have been suggested. For example, the Sims U.S. Pat. No. 4,302,044 discloses rigid doors that pivot around hinges and are secured with mechanical fasteners. The Schmeichel et al U.S. Pat. No. 4,505,512 discloses a flexible tarp that is fixedly secured to one side of the open container, deployed across the top by a roll-up apparatus, and includes a mechanism to retain the roll bar when the tarp is in a covered position.

Where a flexible tarp is used to cover a cargo container opening, many systems for securing the tarp to the container involve the use of straps. For example, the Schmeichel et al. U.S. Pat. No. 4,505,512 discloses straps (60) that extend from the tarp (14) to a roll bar (64) which, in turn, is lodged in hooks (40) that secure the roll bar to the sidewall of the container. The Johnsen U.S. Pat. No. 4,212,492 discloses straps (90) that extend from the tarp cover edge (64) and are fastened by toggle action hooks (92) that secure the straps to the sidewall of the container. The Johnson U.S. Pat. No. 4,212,492 also discloses straps (94) that extend from the rear flap (40) of the tarp and are fastened by hooks (96) that secure the straps to the rear wall of the container.

Where straps extend from the edges of the tarp and are secured to the sidewalls of the cargo container, fastening devices are necessary to secure the straps. Such a fastening device should provide a secure means of attaching the flexible tarp to the cargo container to assure that the tarp will remain in place and intact. A fastening device should also allow easy operation to facilitate quick fastening and unfastening.

Another attribute of a fastening device should be to provide constant tensioning while the flexible tarp is covering the cargo container. For a variety of reasons, a tarp may stretch and tend to loosen. For example, the tarp may loosen due to exposure to the elements such as moisture. During high-speed transportation, the tarp may loosen due to aerodynamic forces exerted by wind passing over the tarp. Also, the tarp may loosen if cargo was initially loaded so as to be heaped above the normal height of the tarp; during transit, the load may settle resulting in a loose tarp. Without a means for constantly maintaining a uniformly tight cover and minimizing fabric movement, the tarp may start to flap, thereby resulting in excessive wear.

Current available fastening devices address some, but not all, of these problems. For example, some fastening devices involve arrangements that employ straps that are made of a resilient material that are fixedly secured to the sidewall of the container. An arrangement of this type is disclosed by the Johnsen U.S. Pat. No. 4,212,492 where the straps (94) are made of a resilient material such as bungy cord, and those straps are fastened by hooks (96) that secure the straps to be rear wall (20) of the container. This arrangement has the shortcoming that the straps may soon lose their resilient character, requiring frequent replacement. Once straps begin to lose their resilient character, the straps will provide less tensioning, thereby allowing the tarp to loosen and permitting fabric movement.

Other fastening devices involve arrangements that employ non-resilient straps that are manually tensioned before being fixedly secured to the sidewall of the container. An arrangement of this type is disclosed by the Johnsen U.S. Pat. No. 4,212,492 where the straps or cord (80) is manually trained through hooks (84, 86) before being fastened to a hook (88) that secures the cord to the sidewall (18) of the container. This arrangement has the shortcoming that it does not provide constant tensioning while the flexible top is covering the cargo container. If the tarp stretches and loosens after the straps are fixedly secured, there is no means to maintain a uniformly tight cover, and the tarp may start to flap, thereby resulting in excessive wear.

Other fastening devices involve arrangements that employ non-resilient straps that are mechanically tensioned before being fixedly secured to the sidewall of the container. An arrangement of this type is disclosed by the Johnsen U.S. Pat. No. 4,212,492 where the strap (90) is attached to a toggle action hook (92) which permits the strap to be tensioned as the toggle action hook is placed into a locked position (FIG. 6) and thereby secured to the sidewall (18).

- Another arrangement of this type is anticipated by cargo strap tensioning devices that employ ratchet wheels as disclosed by Smetz et al. U.S. Pat. No. 4,622,721; Speich U.S. Pat. No. 4,584,742; Rutzki U.S. Pat. No. 4,542,883; van Iperen U.S. Pat. No. 4,510,652; and Holmberg U.S. Pat. No. 4,227,286. Another arrangement of this type is anticipated by truck platform locking devices that employ a lever whose locking means are activated by a spring as disclosed by Nilsson U.S. Pat. No. 4,493,133. Another arrangement of this type is anticipated by tensioning devices that employ a lever and a mechanical locking means as disclosed by Richmond U.S. Pat. No. 4,428,099; and Akaura U.S. Pat. No. 4,395,796. Yet another arrangement of this type is anticipated by a quick release load securement device that employs a tubular housing with a slide member and a lock pin as disclosed by Parnell et al. U.S. Pat. No. 4,314,783.

Arrangements Which involve mechanical tensioning prior to fixedly securing the strap to the sidewall of the container have the advantage of permitting greater tension than manual tensioning devices. Once fixedly secured, however, manual tensioning devices have the same shortcoming, viz., the arrangement does not provide constant tensioning while the flexible tarp is covering the cargo container. If the tarp stretches and loosens after the straps are fixedly secured, there is no means to maintain a uniformly tight cover, and the tarp may start to flap, thereby resulting in excessive wear.

Other fastening devices might involve arrangements that employ non-resilient straps that are mechanically tensioned after being fixedly secured to the sidewall of the container. An arrangement of this type is anticipated by the Parnell et al. U.S. Pat. No. 4,314,783 where a cargo securement band (36) is connected to a compression unit (38) which in turn is connected to a floor anchor (34). Such compression units are used with a separate toggle action fastener that typically is located at the other end of the cargo securement band, although the Parnell et al. U.S. Pat. No. 4,314,783 teaches (FIG. 10) a compression unit (38) that is located next to the fastening device (140).

Yet other fastening devices might involve arrangements that employ non-resilient straps that are mechanically tensioned before and after being fixedly secured to the sidewall of the container. An arrangement of this type is anticipated by load securement devices such as those shown in Neidigk U.S. Pat. No. 4,706,343 where a hydraulic arrangement is used as a fastening and tensioning device.

Arrangements that involve tensioning after fixedly securing the strap permit constant tensioning while the flexible tarp is covering the cargo container. Devices that might attain this attribute were designed to secure straps that hold and constrain heavy cargo loads such as heavy machinery or stacks of lumber placed upon the deck of a railroad flat car. As a consequence, devices that anticipate this type of arrangement are apt to be relatively expensive or complicated in operation. Inexpensive devices might be employed on only one side of the flexible tarp without obtaining a uniform tensioning o all sides of the tarp. If complicated in operation, the device may not allow quick fastening and unfastening.

The present invention addresses some or all of the aforementioned problems.

SUMMARY OF THE INVENTION

In the practice of the present invention, a connecting device is provided or connecting, anchoring and tensioning tensile members, such as tie-down straps on tarpaulins and covers for open-top containers, such as truck and trailer beds and boxes. The connection device includes a base assembly for attachment to a mounting surface, such as the sidewall of an open-top container. A telescopic tube assembly includes an outer tubular member mounted on the base assembly and an inner tubular member telescopically, reciprocally received in the outer tubular member. A compression spring is located within the telescopic tube assembly for extending the inner tubular member. A lever assembly is pivotally mounted on an outer end of the inner tubular member. The lever assembly includes a lever bar and a strap mounting post extending laterally therefrom in spaced relation from a rotational axis of the lever assembly. The lever assembly is pivotal with respect to its rotational axis between a release position whereat a strap end can be placed over the strap mounting post and a lock position with the strap placed in tension. The lever assembly includes an over-center geometry for retention in its lock position.

OBJECTS AND ADVANTAGES OF THE INVENTION

The principal objects and advantages of the present invention include: providing a connecting device; providing such a device for tensile members; providing such a device for connecting, anchoring and tensioning tie-down straps for container covers; providing such a device for connecting, anchoring and tensioning the tie-down straps of tarpaulins and covers for truck and trailer beds and boxes; providing such a device which is adapted for maintaining relatively constant tension in a container tarp or cover; providing such a device which accommodates stretching and/or shrinkage of a tarp or cover; providing such a device which is adapted for mounting on a variety of trailer and truck beds and boxes with various lengths and configurations; providing such a device which is adapted for performing reliably in various weather and climatic conditions; and providing such a device which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

Figure 1:
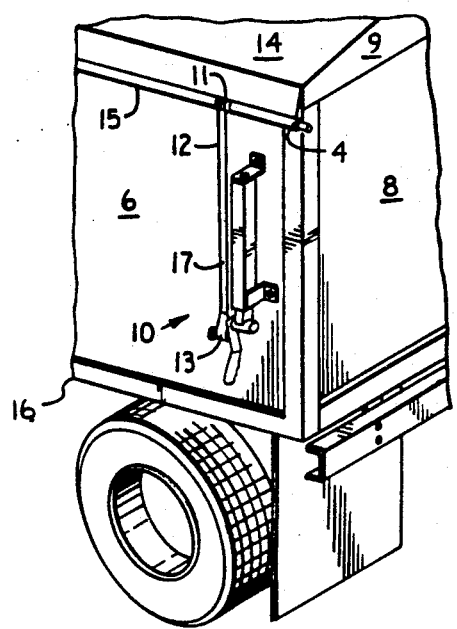
FIG. 1 a perspective view of a rear corner of an open-top cargo container mounting a correcting device which embodies the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

I. Introduction and Environment

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 10 generally designates a connecting device for a tensile member 12. Without limitation on the generality of useful applications of the device 10 of the present invention, the tensile member 12 can comprise, for example, a tie-down strap for securing a tarp or cover 14 on top of a trailer or truck box or bed 16.

The trailer or truck box or bed 16 includes sidewalls 6 and end walls 8. The end walls 8 can mount head caps 9 for arching the tarp or cover 14 over the ends of the box or bed 16. Such head caps are shown in Schmeichel et al. U.S. Pat. No. 4,505,512. Alternatively, the tarp or cover 14 could include a flap or end panel extending downwardly over the end walls 8, whereat one or more additional connecting devices 10 could be utilized for tensioning the tarp or cover 14 longitudinally. The tarp or cover 14 includes a side perimeter or edge 15 whereat multiple straps 17 are attached at their respective proximate ends 11. The straps 17 can comprise various suitable materials with sufficient tensile strength and other characteristics. Such straps are typically formed of the same material as the tarps or covers to which they are attached, such as canvas, nylon or vinyl. The straps 17 have looped distal ends 13. The connecting device 10 generally includes a base assembly or means 18, a telescopic tube assembly or biasing means 20 and a lever assembly or means 22.

II. Base Assembly or Means 18

The base assembly or means 18 comprises a plurality (e.g., three are shown) of angle mounting clips 24a, 24b, 24c each having a base leg 26 and a projecting leg 28 intersecting at a right dihedral angle. The clips 24 can be attached to the sidewall 6 by any suitable fastening means (e.g., welding, rivets, screws, etc.) such as the bolts 30 and nuts 32 which are shown attaching the base legs 26 to the sidewall 6.

In the application shown in FIG. 1, the mounting clips 24a, 24b and 24c are attached to the sidewall 6 in a generally triangular configuration with clip 24a in the uppermost apex position and clips 24b and 24c in the lowermost, laterally spaced positions at the triangle base. Alternative numbers of clips 24 in alternative mounting configurations could also be used. The mounting clip base legs 26 are holed to receive the mounting bolts 30, and the projecting leg 28 of the uppermost clip 24a is also holed in proximity to its outer end.

III. Telescopic Tube Assembly or Biasing Means 20

The telescopic tube assembly 20 includes an outer tubular member 34 with a first end 36 closed by the mounting clip 24a and a second, open end 38 located generally between the projecting legs 28 of the mounting clips 24b, 24c. An outer tubular member bore 40 extends between the ends 36, 38 and is open at the second end 38.

An inner tubular member 42 is telescopically, reciprocally located within the outer tubular member bore 4 and includes an inner end 44 and an outer end 46 mounting a sleeve 48 with a throughbore 50. The sleeve 48 extends generally transversely with respect to the inner tubular member 42.

The tube assembly 20 includes extension means in the form of a helical compression spring 52 for biasing the inner tubular member 42 from a retracted position within the outer tubular member 34 to an extended position.

The spring 52 impinges upon the projecting leg 28 of the uppermost angle mounting clip 24a at the outer tubular member closed end 36 and impinges upon the inner tubular member inner end 44. A retaining pin 54 extends through the projecting leg 28 of the uppermost angle mounting clip 24a and through the inner tubular member inner end 44. The retaining pin has a first end 56 with a head 58 which can be affixed to the mounting clip projecting leg 28. The retaining pin also includes a second end 60 with stop means 62, such as a head or nut which will not pass through the inner tubular member closed end 44. The inner tubular member inner end 44 can be holed for slidably receiving the retaining pin 54.

IV. Lever Assembly 22

The lever assembly 22 includes a lever bar 68 with proximate and distal sections 70, 72 forming an obtuse included angle with respect to each other at an intersection 74. The lever bar 68 includes proximate and distal ends 76, 78. The distal section 72 mounts a hand grip 80 over the distal end 78. With the lever bar 68 in its locked position (FIG. 6), the obtuse angle formed by the lever bar sections 70, 72 is open outwardly. The lever bar 68 can comprise a flat bar for the proximate section 70 and a length of pipe for the distal section 72, with the pipe deformed at one end to receive the flat bar.

An axle post or hinge pin 82 is mounted on the lever bar 68 in proximity to its proximate end 76. The axle post 82 includes a proximate end 84 fixedly attached to the lever bar 68 adjacent to its proximate end 76, for example by welding or by a rivet 86. The axle post 82 is rotatably journaled in the sleeve 48 and is retained therein by a disk-shaped retainer 88 mounted on a distal end 90 thereof. The axle post 82 and the sleeve 48 are coaxial on a rotational axis 92 of the lever assembly 22.

A strap mounting post 94 includes a proximate end 96 fixedly attached to the lever bar proximate section 70 in spaced relation from the rotational axis 92 and a distal end 98. The strap mounting post 94 extends laterally outwardly from the lever bar 68 in generally parallel, spaced relation with respect to the rotational axis 92. The strap mounting post 94 mounts a disk-shaped strap retainer 100 on its distal end 98. The strap retainer 100 preferably will pass the strap looped end 13, but will retain the same on the strap mounting post 94 when the strap 17 is under tension.

V. Operation

Appropriate numbers of the connecting devices 10 can be installed as necessary on the sidewalls of containers to be covered by tarpaulin and other flexible covers. For example, over-the-road semi-trailers are often manufactured in certain standard lengths, e.g., twenty-two ft., which can be fitted with four connecting devices 10 on each side; thirty-two ft., which can utilize six connecting devices 10 on each side, and forty-two ft., which can utilize six connecting devices on each side thereof. Typical farm trucks can mount three connecting devices 10 per side.

Four of the connecting devices 10 can be placed on the sidewalls 6 adjacent to the end walls 8 for securing the corners 4 of the tarpaulin or cover 14. Intermediate connecting devices 10 can be located in spaced relation between the corner connecting devices 10 as needed. The connecting devices 10 can be used on both sides of the box or bed 16, or they can be used on only one side thereof in conjunction with a roll-up tarp assembly whereby the tarp is fastened to a pipe along one side thereof, which in turn is fastened to the trailer sidewall in proximity to its upper end. The operational benefits of the connecting device 10 can be obtained in both one-sided and two-sided applications of the connecting device 10. The cover 14 can comprise vinyl-impregnated nylon, canvas and other suitable materials.

Figure 2:
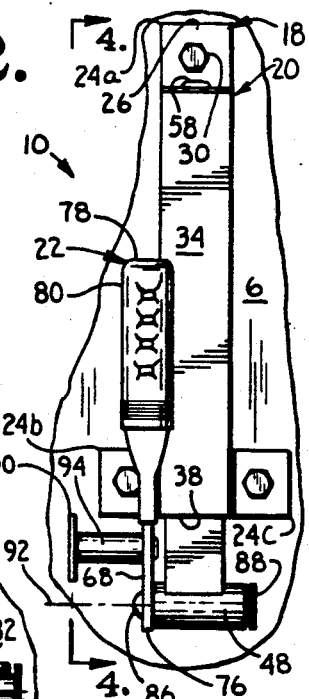
FIG. 2 an enlarged, elevational front view of the present invention.
Figure 3:
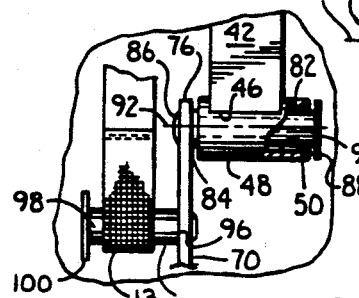
FIG. 3 an enlarged, fragmentary, front and elevational view of the present invention taken generally along line 3—3 in FIG. 6.
Figure 4:
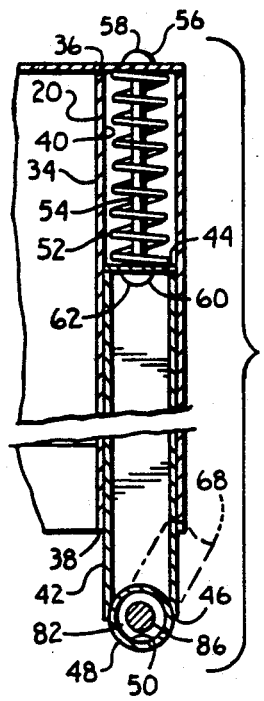
FIG. 4 is a fragmentary, cross-sectional view of the present invention taken generally along line 4—4 in FIG. 2.

The length of the straps 17 and the locations of the connecting devices 10 are such that the strap end loops 13 can be placed over the strap mounting posts 94 easily when the respective lever assemblies 22 are in their upper release positions (FIG. 2). In this position the spring 52 can be in an extended position thereof with the retaining pin stop means 62 engaging the inner tubular member inner end 44 (FIG. 4). An operator can grasp the hand grip 80 and swing the lever assembly 22 first outwardly, then downwardly and finally inwardly through an arch of movement between release and lock positions about the rotational axis 92.

Figure 5:
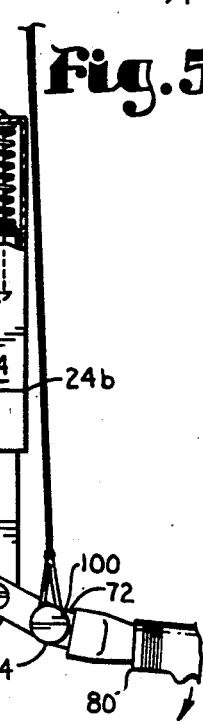
FIG. 5 is a side elevational view of the present invention with portions away to show the operation of the compression spring when the lever assembly is being moved into the locked position.
Figure 6:
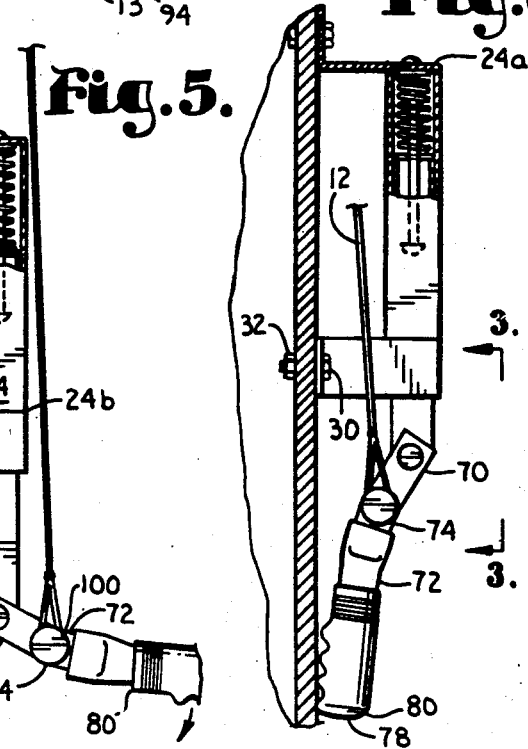
FIG. 6 is a side elevational view of the present invention with portions broken away to show the operation of the compression spring when the lever assembly is in its locked position.

An over-center locking effect is provided by configuring the connecting device 10 such that the central axis of the strap mounting post 94 is located inwardly from the rotational axis 92 with the lever assembly 6 in its lock position (FIG. 6). The maximum tension in the strap 17 and compression in the spring 52 are achieved when the lever assembly 22 is in its "bottom dead center" position, i.e., with the strap 17, the rotational axis 92 and the strap mounting post 94 aligned. When the lever assembly 22 is rotated (i.e., clockwise as shown in FIGS. 4-6) over-center past bottom dead center towards the trailer sidewall 6, the geometric configuration of the system is such that the inner tubular member 42 and the spring 52 are slightly extended. The spring force thus retains the lever assembly 22 in its lock position with the hand grip 80 against the trailer sidewall 6. The spring 52 permits the connecting device 10 to maintain a relatively constant tension in the straps 17 with a correspondingly relatively constant transverse tension the tarpaulin or cover 14.

An important advantage with the connecting device 10 is its ability to react to dimensional changes in the tarpaulin 14 and/or the straps 17. In particular, such changes can occur as the tarpaulin 14 and the straps 17 stretch. Temperature changes, direct exposure to sunlight and a general weakening of the materials can all effect such dimensional changes. Maintaining relatively constant transverse tension in the tarp or cover 14 can be important for prolonging tarp life and minimizing aerodynamic drag. Furthermore, slackness in the tarpaulin or cover 14 can permit rainwater to collect in pools thereon and further deform the tarp or cover 14.
**

Releasing the tarp or cover 14 from the connecting devices 10 can be accomplished relatively easily by rotating the lever assemblies 22 from their lock positions in a counterclockwise direction (as shown in FIGS. 4-6) to their release positions.

It is to be understood that while certain forms of the present invention have been illustrated and described herein, it is not to be limited to the specific forms or arrangement of parts described and shown.

What is claimed and desired to be secured by Letters Patent is as follows:

1. A tensile member connecting device, which comprises:
   (a) base means;
   (b) a lever assembly with proximate and distal ends, said lever assembly having a transverse pivotal axis at its proximate end;
   (c) said lever assembly including attachment means for attaching the tensile member to the lever assembly in spaced relation from the lever assembly pivotal axis; and
   (d) biasing means connected to said base means and to said lever assembly for biasing said lever assembly in a direction generally away from the tensile member, said biasing means comprising:
      (i) an outer, tubular member mounted on said base means;
      (ii) an inner tubular member telescopically received in said outer tubular member and telescopically movable between extended and retracted positions; and
      (iii) extension means for extending said inner tubular member toward its extended position.

2. The device of claim 1 wherein:
   (a) said extension means comprises a helical compression spring mounted within said outer tubular member.

3. The device of claim 2 wherein said tube assembly includes:
   (a) said outer tubular member having a closed first end and an open second end with said inner tubular member extending through said open second end; and
   (b) a tube retainer pin extending through said compression spring and interconnecting said outer tube first end and said inner tube inner end, said inner tube inner end slidably receiving said retainer pin.

4. The device of claim 3 wherein:
   (a) said base means includes an angle clip with a base leg and an extension leg, said extension leg extending from said base leg and being mounted on said outer tubular member.

5. The device of claim 4 wherein said base means includes:
   (a) said angle clip comprising a first angle clip mounted on said outer tubular member first end; and
   (b) second and third angle clips each having a base leg and an extension leg mounted on said base leg, said extension legs of said second and third angle clips being mounted on said outer tubular member adjacent the second end thereof on opposite sides thereof.

6. The device of claim 1 wherein:
   (a) said inner tubular member includes an inner end positioned within said outer tubular member and an outer end; and
   (b) said lever assembly is pivotally mounted on said inner tubular member outer end at said pivotal axis.

7. The device of claim 1, which includes:

(a) said tube assembly having a sleeve mounted on said inner tubular member outer end generally coaxially with said pivotal axis;
(b) said lever assembly includes an axle post extending laterally from said lever bar proximate end generally coaxially with said pivotal axis; and
(c) said axle post being rotatably journaled in said sleeve.

8. The device of claim 7 which includes:
(a) said axle post having a proximate end mounted on said lever bar proximate end and a distal end; and
(b) a retainer disk mounted on said axle distal end for retaining said axle within said sleeve.

9. A tensile member connecting device, which comprises:
(a) base means;
(b) a lever assembly with proximate and distal ends, said lever assembly having a transverse pivotal axis at its proximate end;
(c) said lever assembly including attachment means for attaching the tensile member to the lever assembly in spaced relation from the lever assembly pivotal axis, said attachment means comprising a post extending laterally outwardly from said lever assembly in a direction generally parallel to said pivotal axis; and
(d) biasing means connected to said base means and to said lever assembly for biasing said lever assembly in a direction generally away from the tensile member.

10. The device of claim 9 wherein:
(a) said lever assembly is swingable between a release position with said attachment means on one side of said pivotal axis and a lock position with said attachment means on the other side of said pivotal axis.

11. The device of claim 10 wherein:
(a) said tensile member is placed in maximum tension when aligned with said lever assembly pivotal axis and said attachment means between said lever assembly lock and release positions.

12. The device of claim 9 wherein said lever assembly includes:
(a) a lever bar; and
(b) said post including an inner end mounted on said lever bar and an outer end, said post further including a retainer disk mounted on said post outer end.

13. The device of claim 12 wherein:
(a) said lever bar includes a proximate section with said proximate end and said post and a distal section with said distal end, said lever bar sections forming an outwardly-open obtuse angle with respect to each other.

14. The device of claim 13 wherein said lever assembly includes:
(a) a hand grip mounted on said lever bar distal section.

* * * * *